Sept. 15, 1970   P. MALLENER   3,528,483
CONTINUOUS-CASTING MOLD ASSEMBLY
Filed April 29, 1968   2 Sheets-Sheet 1

INVENTOR.
PAUL MALLENER
BY Sandoe, Neill, Schotter
& Wilstrom
ATTORNEYS

Sept. 15, 1970 P. MALLENER 3,528,483
CONTINUOUS-CASTING MOLD ASSEMBLY
Filed April 29, 1968 2 Sheets-Sheet 2
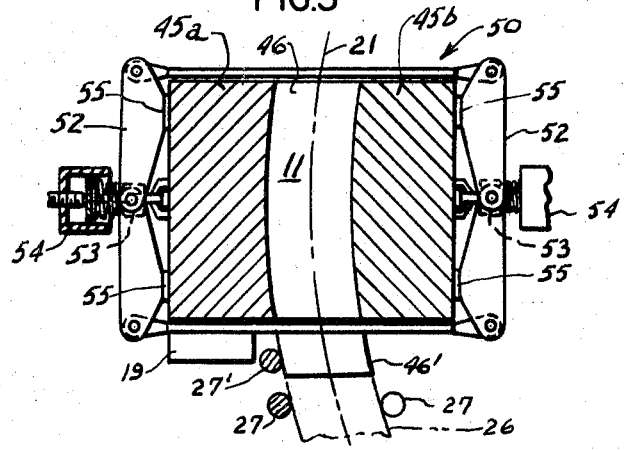
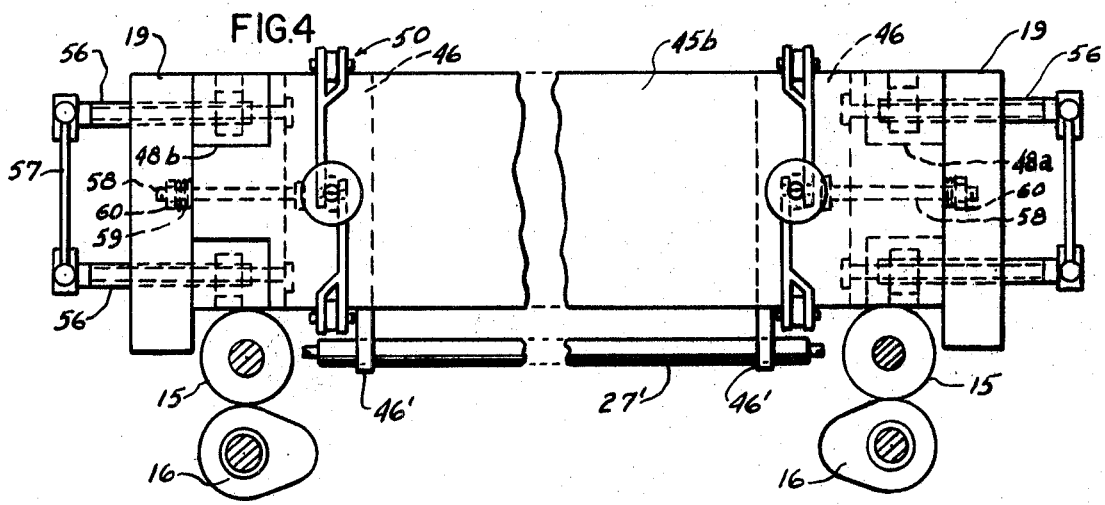
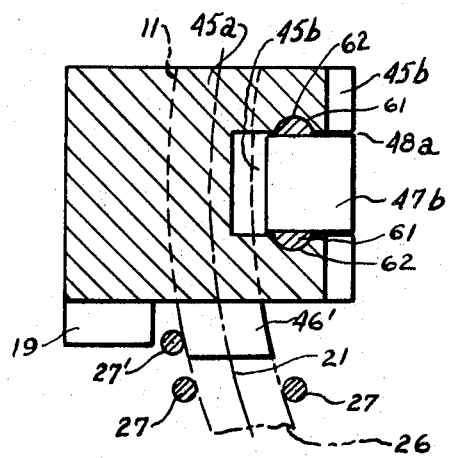
INVENTOR.
PAUL MALLENER
BY Sandoe, Neill, Schotter
& Wilestrom
ATTORNEYS United States Patent Office 3,528,483
Patented Sept. 15, 1970

3,528,483
CONTINUOUS-CASTING MOLD ASSEMBLY
Paul Mallener, Dusseldorf, Germany, assignor to Schloemann Aktiengesellschaft, Dusseldorf, Germany, a German company
Filed Apr. 29, 1968, Ser. No. 724,722
Claims priority, application Germany, May 11, 1967, 1,558,311
Int. Cl. B22d 27/08
U.S. Cl. 164—260    15 Claims

ABSTRACT OF THE DISCLOSURE

A continuous-casting mold assembly has a mold body with an open-ended mold cavity arcuately through it and an arcuate surface corresponding to and parallel to the arc of the cavity. Means are provided to oscillate the mold body in the general axial direction of the mold cavity. A pair of guide elements are adjustably positioned to engage the arcuate surface at points spaced apart on its arc to define an arcuate path of oscillatory movement of the mold body, and spring means are operatively mounted to resiliently urge the mold body in the direction in which the arcuate surface of the mold body is pressed against the guide elements, the arcuate surface being adapted to slide across surfaces of the guide elements.

---

The present invention is an oscillating arcuate mold for casting of metal, such as steel.

In continuous casting, molten metal is poured in the upper end of an open-ended mold cavity. The mold is continuously cooled so that the periphery of metal in the mold solidifies to form a strand which emerges from the lower or exit end of the mold cavity, and as the strand leaves the mold more molten metal is poured into the top of the mold for casting a continuous strand. It is customary to oscillate the mold longitudinally a short distance to faiclitate mold release and increase the casting rate.

In known methods of continuous-casting the casting is carried out in a generally vertical line using a mold with an arcuate cavity to facilitate the entry of the emerging strand into a curved strand guide which conducts the strand down in a curved path to be straightened into a path along which the strand is further worked. The strand guide is suitably constituted by rolls arranged to support and guide the strand along the desired path.

In order to prevent damage to the solidified, but fragile, skin of the strand emerging from the mold, the mold should be mounted and its oscillatory movement controlled so that the exit end of the mold cavity is accurately aligned with the entrance of the strand guide and oscillates in an arc corresponding to the arc of the entrance portion of the curved strand guide.

An object of the present invention is to provide a simple and effective continuous-casting mold assembly with which an oscillating mold having an arcuate mold cavity is accurately aligned with the entrance to the curved strand guide below, and with which the path of oscillatory movement of the mold is simply and accurately adjusted to coincide with the arcuate path defined by the entrance to the strand guide.

Another object is to provide a mold assembly in which the length of mold cavity, which defines the width of the strand being cast, is adjustable.

Among the advantages of the mold assembly of this invention are that the positioning of the mold in the correct operative alignment in the continuous-casting apparatus is accomplished more quickly and easily than with previously known assemblies. Also the simple construction of this assembly facilitates the arrangement of a water jacket and cooling water connections for cooling the mold.

The mold assembly of this invention includes a mold body having an open-ended mold cavity arcuately through it and an arcuate guide surface at each end of the mold body with the curvature of the guide surface corresponding to, and parallel with, the arc of the mold cavity. Adjustably positioned guide elements, provided by levers which have adjustably positioned pivot points and which are adapted to be fixed in selected positions of adjustment, have end surfaces adapted to engage the arcuate guide surfaces at points spaced apart in the arcuate direction of each guide for defining an arcuate path for oscillatory movement of the mold body. The mold body is resiliently urged in the direction in which the arcuate guide surfaces are pressed against the end surfaces of the guide elements by spring means which bear against the mold body to hold the abutting surfaces in engagement as the guide surfaces slide across the ends of the guide elements when the mold body oscillates.

Oscillation of the mold body is suitably accomplished by rolls which are underneath the mold body and on which the mold body rests. These rolls are mounted to be able to move up and down in the direction of oscillation and are moved to oscillate the mold body by driven cams engaging the lower sides of the rolls.

In a preferred form the mold body is formed by a pair of oppositely arranged, interfitting L-shaped side members spaced apart by end members between the side members. The mold cavity is defined by the space between the end members and between the side members. The relative positions of the end members are adjustable for adjusting the length of the space between the side members as means for adjusting the width of the strand being cast, and the side and end members are held rigidly together by clamps passing around the mold body.

In this preferred form of the mold body, the guide surfaces are provided by arcuate surfaces of projections respectively from the opposite ends of the mold body, the projections both being attached to, or integral parts of, one of the two separable side members.

An illustrative embodiment of a mold assembly in accordance with the present invention is described below with reference to the accompanying drawings in which:

FIG. 3 is a sectional view along the line 3—3 of FIG. 2;

FIG. 4 is a side elevation of the mold assembly of FIG. 1, looking at it from the left side of the view shown in FIG. 2; and FIG. 5 is a sectional view along the line 5—5 of FIG. 2.

Figure 1:
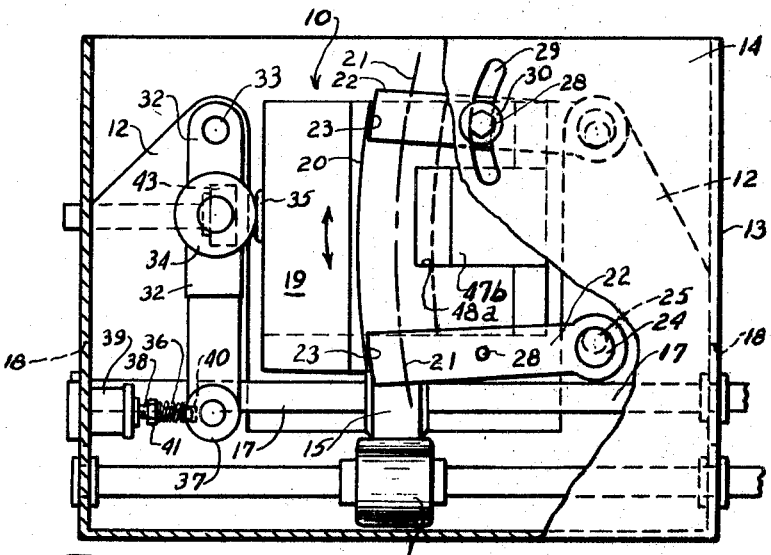
FIG. 1 is an end elevation of a continuous-casting mold assembly embodying the invention.

Referring to the drawings, a mold body 10, having an open-ended mold cavity 11 arcuately therethrough, is received in U-shaped frame elements 12, which are attached between the sides of a frame formed by frame sides 13 and frame ends 14. The mold body rests on rolls 15 below opposite end portions of the mold and is oscillated up and down by driven cams 16 which are journalled through the frame sides 13 to bear on the undersides of the rolls 15 and move the rolls 15 up and down, the rolls 15 being mounted for this up and down movement by having the ends of the shafts 17, on which they are carried, received through vertical slots 18 in the frame sides 13.

At opposite ends of the mold body 10 are projections 19 which each have an arcuate guide surface 20 corresponding to, and parallel to, the arc of the mold cavity 11. The arc of the mold cavity 11 is most clearly indicated by the curved dash line 21 representing the centerline through the mold cavity. The guide surfaces 20 may be provided by wear plates welded, or otherwise attached, on the sides of the projections 19 toward the centerline 21.

Pairs of guide levers 22 adjustably mounted on the frame elements 15 respectively adjacent each end of the mold body 10, have end surfaces 23 adapted to be engaged by the guide surfaces 20 of the projections 19 for defining the path of oscillatory movement of the mold body 10. For adjusting the positions of the end surfaces 23 of the guide levers 22, the opposite ends of the guide levers 22 are pivotally mounted on the frame elements 12 by having eccentric bushings 24, which are rotatively carried in the guide levers 22, rotatable on pivot pins 25 mounted in the frame element 12. Thus, by rotating the eccentric bushings 24 the centers of rotation of the guide levers 22 are shifted in a plane at right angles to the guide surface 20 and this in conjunction with the pivotal movement of the guide levers 22 about the bushings 24 permit considerable adjustment of the positions of their end surfaces 23.

The positions of the end surfaces 23 are adjusted so that, with the guide surfaces 20 of the projections 19 on the mold body 10 bearing against them, they will guide the mold body 10 in an oscillatory path in which the centerline 21 coincides with the centerline of a strand guide 26, defined by rolls 27 (FIG. 3), below the lower, exit end of the mold cavity 11 in order to avoid damage to the cast strand of metal as it passes from the mold cavity 11 into the entrance of the strand guide 26. As shown, the guide levers 22 at each end of the mold are arranged so that their respective end surfaces 23 are engaged by the guide surfaces 20 at points spaced apart, in the arcuate direction, on the guide surfaces to provide a firm guide for arcuate movement of the mold body 10. The end surfaces 23 of the guide levers are relatively long and are curved on a wide radius so that the surface pressure exerted on them by the guide surfaces 20 will be well distributed so as to reduce friction and reduce wear.

When the guide levers 22 are moved to the desired positions of adjustment they are fixed in position by bolts 28 threaded into the guide levers and projecting through arcuate slots 29 in the frame ends 14. Slots 29 are made sufficiently wide to permit the necessary lateral movement of the bolts 28 and guide levers 22 for adjusting the position of the pivot points of the guide levers. When the guide levers are in the desired lateral and radial positions they are clamped by tightening the bolts 28 to clamp the edges of the slot 29 between washers 30 and ferrules 31 on the bolts 28.

As the mold body 10 oscillates the guide surfaces 20 on projections 19 are held against the end surfaces 23 of the guide levers 22 under resilient pressure (which permits the necessary lateral movement of the mold body 10) by spring loaded levers 32 which is pivoted on the frame elements 12 at 33. A roll 34 is rotatably mounted on each lever 32 to bear against a striker plate 35 on the side of the mold body 10 away from the guide surface 20. The levers 32 are urged toward the mold body 10 by springs 36 mounted to press against rolls 37 which are rotatably mounted respectively on the lower ends of the levers 32. Each spring 36 is carried on a piston rod 38 of a power (air or hydraulic) cylinder 39. The piston 38 rod extends loosely into an appropriate hole 40 through the edge of the roll 37 and the spring 36 is compressed between a nut 41, on the piston rod, and the periphery of the roll 37. The holes 40 in rolls 37 are deep enough to permit the levers 32 to swing back and forth relative to the ends of the piston rods 38, against the pressure of springs 36, to permit the necessary back and forth movement of the mold body 10 as it oscillates in the arcuate path defined by the ends of the guide levers 22. The power cylinder 39 provides means for adjusting the lateral positions of the piston rods 38, and hence the nuts 41, for adjusting the pressure with which springs 36 operate to hold the guide surfaces 20 against the end surfaces 23 of guide levers 22.

From the above it will be noted that the mold body 10 is supported on the bottom by resting on the rolls 15, and is supported laterally by the three point support provided by the end surfaces 23 of guide levers 22 bearing against the guide surfaces of the mold body 10 at one side and the rolls 34 on levers 32 resiliently urged against the striker plates 35 at the opposite side.

The vertical oscillatory movement of the mold body 10 is steadied and guided by at least one vertical rib 42 attached to a side of the mold and rolls 43 on shafts 44 embracing the opposite sides of the rib 42 which moves up and down between the rolls. The shafts 44 are suitably journalled through the frame of the apparatus and either the shafts 44, or the position of the rib 42 on the mold body 10, may be mounted to be adjusted laterally for adjusting the longitudinal position of the mold body 10 with the frame of the apparatus.

The mold body 10 may be any conventional construction modified to provide the arcuate guide surfaces 20, but a preferred form of a mold body 10 illustrated in the drawings is formed by two separable side members 45a and 45b with end members 46 clamped between. The side members 45a and 45b are L-shaped and oppositely arranged with the tenons 47a, 47b at the ends of the vertical legs of the L-shapes fitting respectively in mortises 48b and 48a in their horizontal legs. The side members 45a, 45b have plates 49 of a mold lining material, such as copper, attached thereon to define the sides of mold cavity 11. The interfitting mortises 48a and 48b and tenons 47b and 47a enable the side members 45a, 45b to come together sufficiently for the end members 46 to be held in place between by clamps 50 around the end portions of the assembled mold body 10. As shown, each clamp 50 is suitably provided by straps 51 respectively across the top and bottom of the mold body 10 with toggles 52 connected between the ends of the straps at each side of the mold body. The knee joints 53 of the toggles have screw jack devices 54 mounted on them to be tightened against the respective sides of the mold body 10 for drawing the knee joints 53 inward to rock the levers of the toggles around pads 55 against the sides of the mold body to press the side members 45a, 45b toward each other to grip the end members 46 between.

The width of the mold cavity 11 is defined by the width of the end members 46; the length is adjustable by adjusting the space between the end members. The position of the end members 46, and their vertical alignment, is maintained by thrust spindles 56 threaded through the horizontal legs of the L-shaped side members 45a, 45b, respectively above and below the mortises 48a, 48b with their inward ends connected to the adjacent end members 46. The outward ends of the spindles 56 of each vertical pair are rotatively connected to a cross-bar 57 so that each vertical pair is a U-shaped stabilizing unit for the end members. The end members 46 are positioned by turning the screw threaded spindles 56 in their mounting and are held firmly in position by rods 58 supported loosely through the tenons 47a, 47b, with the inner ends of the rods 58 being connected to the end members 46 and their outer ends having springs 59 compressed between the outer walls of the tenons 47a, 47b and nuts 60 threaded on the rods.

Figure 2:
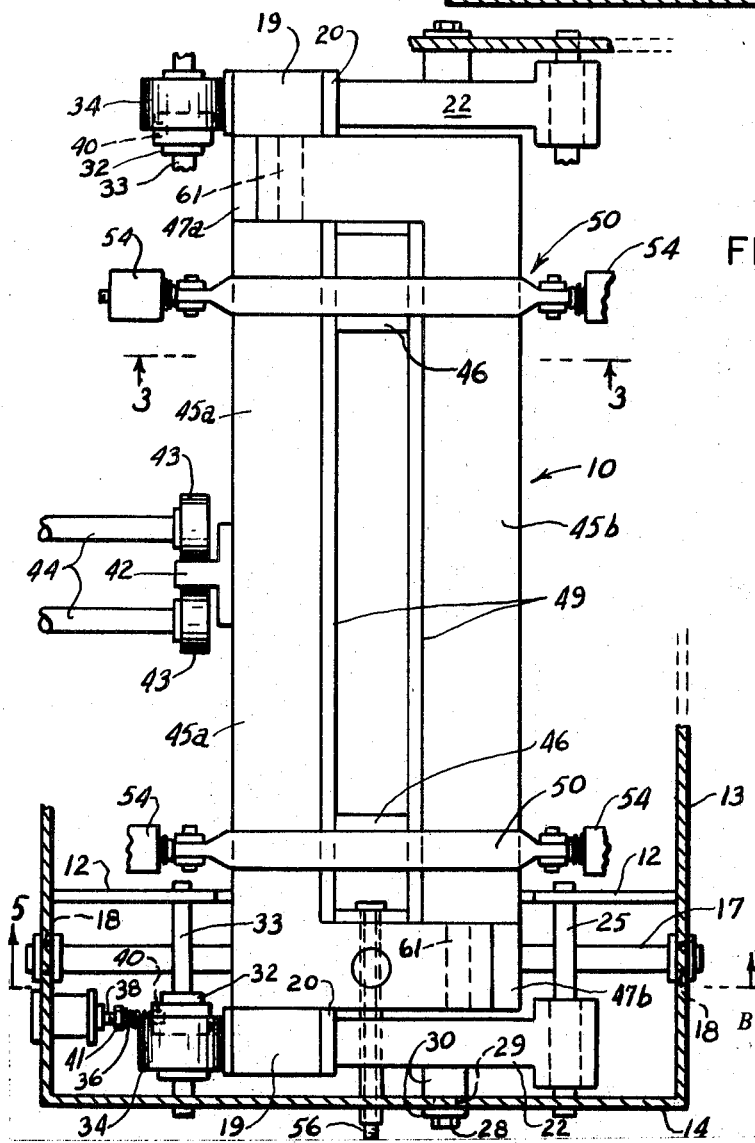
FIG. 2 is a top plan view of the mold assembly shown in FIG. 1.

The projections 19 of the mold body 10 of this embodiment are both on the side member 45a so that the vibration imparted to the mold body 10 by the rolls 15 is communicated through a single member (side member 45a), thereby enhancing the rigidity of the assembled mold body unit. As shown, the projection 19 at one end of the side member 45a is connected to, or integral with, the outer wall of the horizontal leg of the L-shape; at the other end (upper end in FIG. 2) the projection 19 is connected to, or integral with, the outer wall of the tenon 47a.

Referring to FIG. 5 the two side members 45a, 45b are firmly interfitted to maintain their inner, mold-cavity defining walls parallel, by half-cylindrical shims 61 received respectively in appropriate half-round grooves 62 in the upper and lower walls of the mortises 48a, 48b to wedge against the adjacent surfaces of the respective tenons 47b, 47a.

As shown in FIGS. 3 and 5, the lower ends 46' of the end members 46 extend below the bottom of the mold body 10, as defined by the bottoms of side members 45a, 45b, and the edge 63 of each end 46' is curved in an arc corresponding to, and being an extension of, the arc defined by the adjacent side of mold cavity 11 so as to be engaged by a roll 27' that is the uppermost roll of the series of rolls 27 which define the strand guide 26. Thus, when the guide levers 22 are adjusted so that their end surfaces 23 guide the mold body 10 to oscillate in a path in which the arcuate center line of the mold cavity 11 matches the arcuate center line of the upper, entrance, end of the strand guide 26, the roll 27' will ride on the arcuate edges 46' of the end members 46 to provide additional stability and guidance for the oscillatory movement of the mold body and assure correct alignment of the mold cavity 11 with the strand guide 26.

What is claimed is:

1. A continuous-casting mold assembly comprising a mold body having an open-ended mold cavity arcuately therethrough, said body having an arcuate surface corresponding to the arc of the cavity and parallel thereto, a pair of adjustably supported guide elements each having an end surface adapted to engage a portion of said arcuate surface, means for fixing the guide elements in positions for their said end surfaces to engage said arcuate surface at points spaced apart on its arc for defining an arcuate path of movement of the mold body, means for resiliently urging the mold body in a direction in which its arcuate surface pressure against said end surfaces of the guide elements, and means for oscillating the mold body to slide its arcuate surface in the arcuate direction relatively across the end surfaces of the guide elements.

2. The assembly of claim 1 in which said guide elements comprise a pair of guide levers pivotally mounted to swing in a plane substantially at right angles to said arcuate surface of the mold body, means for moving the pivot points of each lever and fixing them in different selected positions in said plane, and means for fixing each lever in selected radial positions about its pivot point.

3. The assembly of claim 2 in which said means for moving the pivot point of each lever and fixing it in selected positions comprise a pivot pin with an eccentric bushing mounted therein, said bushing being rotatable to selected radial positions on the pivot pin, and said lever being rotatable to selected radial positions on the bushing.

4. The assembly of claim 1 in which said means for resiliently urging the mold body in said direction comprises a lever pivotally mounted to swing toward and away from the side of the mold body which faces in the opposite direction from said arcuate surface, a roll rotatably mounted on the lever to engage said side of the mold body, and spring means operatively connected for urging the lever toward the mold body for pressing said roll resiliently against said side.

5. The assembly of claim 4 including adjustable pressure means for adjusting the pressure of said spring means.

6. The assembly of claim 1 in which the mold cavity is substantially vertically through the mold body, and in which the means for oscillating the mold body comprises at least one rotatable support roll in position under the mold body with the mold body resting thereon, and a cam engaging the underside of the support roll and being rotatable for moving the support roll up and down.

7. The assembly of claim 1 which includes guide means for guiding and supporting the mold body as the mold body oscillates.

8. The assembly of claim 7 in which said guide means comprises a rib projecting from a side of the mold received between a pair of rolls.

9. The assembly of claim 1 adapted for delivering a strand of metal formed in mold cavity downward into the entrance of a strand guide that has a roll defining one side thereof, said assembly including projections extending below the mold body at opposite ends of the mold cavity, said projections each having an arcuate edge surface extending downward at the end of one side of the mold cavity and having the same curvature as said one side of the mold, and the arcuate edge surfaces of both projections extending downward from opposite ends of the same side of the mold cavity and facing outward from the centerline through the mold cavity to be engaged by said roll of the strand guide, whereby the arcuate surfaces of said projections slide up and down in contact with said roll as the mold body oscillates for guiding the oscillatory path of movement of the mold body relative to the entrance to the strand guide.

10. The assembly of claim 1 in which said mold body comprises a pair of separable side members, a pair of end members received between the side members, the mold cavity being defined by space between the end members and between the side members, and means for clamping the side members against the end members.

11. The assembly of claim 10 including means for adjusting the spacing between the end members thereby to adjust the length of the mold cavity.

12. The assembly of claim 10 in which said side members comprise a pair of oppositely arranged L-shaped members with the end of one leg of each member having a mortise adapted to receive a tenon on the end of one leg of the other member.

13. The assembly of claim 12 including means for adjusting the spacing between the end members, as means for adjusting the length of the mold cavity, comprising screw means carried through the opposite end legs of the oppositely arranged L-shaped members and connected respectively to the end members.

14. The assembly of claim 12 including half-cylindrical shims respectively between opposite sides of said tenons and the adjacent surfaces of the mortises for maintaining the side members in fixed position relative to each other.

15. The assembly of claim 10 which includes one said arcuate surface at each opposite end of the mold body, said arcuate surfaces being on projections respectively from the ends of the mold body with both of the latter projections being from the same one of said side members, there being a pair of said guide elements for each of said arcuate surfaces.

References Cited

UNITED STATES PATENTS

| 2,947,075 | 8/1960 | Schneckenburger et al. 164—282 X |
| 3,049,769 | 8/1962 | Schultz. |
| 3,292,216 | 12/1966 | Colombo. |
| 3,409,070 | 11/1968 | Ciochetto 164—282 X |

FOREIGN PATENTS

| 1,125,594 | 3/1962 | Germany. |
| 169,878 | 12/1959 | Sweden. |

J. SPENCER OVERHOLSER, Primary Examiner

R. S. ANNEAR, Assistant Examiner

U.S. Cl. X.R.

164—83, 280, 282